United States Patent
Marquezan et al.

(10) Patent No.: US 11,456,929 B2
(45) Date of Patent: Sep. 27, 2022

(54) CONTROL PLANE ENTITY AND MANAGEMENT PLANE ENTITY FOR EXCHANING NETWORK SLICE INSTANCE DATA FOR ANALYTICS

(71) Applicant: HUAWEI TECHNOLOGIES CO., LTD., Guangdong (CN)

(72) Inventors: Clarissa Marquezan, Munich (DE); Ishan Vaishnavi, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/093,992

(22) Filed: Nov. 10, 2020

(65) Prior Publication Data
US 2021/0058302 A1    Feb. 25, 2021

Related U.S. Application Data

(63) Continuation of application No. PCT/EP2018/062226, filed on May 11, 2018.

(51) Int. Cl.
*H04W 24/08* (2009.01)
*H04L 41/5009* (2022.01)
(Continued)

(52) U.S. Cl.
CPC .......... *H04L 41/5009* (2013.01); *H04L 41/12* (2013.01); *H04W 24/08* (2013.01); *H04W 16/18* (2013.01)

(58) Field of Classification Search
CPC ..... H04W 16/18; H04W 16/10; H04W 24/08; H04W 28/16; H04W 16/0268;
(Continued)

(56) References Cited

U.S. PATENT DOCUMENTS 7,328,262 B2   2/2008  McDonagh et al.
7,596,373 B2   9/2009  McGregor et al.
(Continued)

FOREIGN PATENT DOCUMENTS

CN       1625126 A    6/2005
CN     104468688 A    3/2015
(Continued)

OTHER PUBLICATIONS

3GPP TS 32.425 V15.0.0 (Mar. 2018), 3rd Generation Partnership Project; Technical Specification Group Services and System Aspects; Telecommunication management; Performance Management (PM); Performance measurements Evolved Universal Terrestrial Radio Access Network (E-UTRAN) (Release 15), 87 pages.
(Continued)

*Primary Examiner* — Tom Y Chang
(74) *Attorney, Agent, or Firm* — Womble Bond Dickinson (US) LLP

(57) ABSTRACT

The present disclosure relates to End-to-End (E2E) Quality of Service (QoS) monitoring for strict E2E performance requirements in 5G networks including Network Slices (NSs) or Network Sub Slices (NSSs). The present disclosure provides a a control plane entity for obtaining NS Instance (NSI) data for analytics from a management plane entity, and a management plane entity to provide NSI data to a control plane entity. The control plane entity is configured to request NSI topology information from the management plane entity, obtain at least one first set of Key Performance Indicators (KPIs) or at least one set of measurements, and generate the data for analytics based on the requested NSI topology information and at least one of the obtained first set of KPIs or the obtained one at least one set of measurements.

20 Claims, 11 Drawing Sheets

(51) Int. Cl.
*H04L 41/12* (2022.01)
*H04W 16/18* (2009.01)

(58) Field of Classification Search
CPC .......... H04W 28/24; H04L 4/50; H04L 84/00; H04L 43/08; H04L 43/00; H04L 47/00
See application file for complete search history.

(56) References Cited

U.S. PATENT DOCUMENTS

| | | | |
|---|---|---|---|
| 7,599,307 | B2 | 10/2009 | Seckin et al. |
| 7,904,079 | B1 | 3/2011 | Lundy et al. |
| 8,023,415 | B2 | 9/2011 | Soomro et al. |
| 8,385,221 | B2 | 2/2013 | Chetlur et al. |
| 9,424,121 | B2 | 8/2016 | Kushnir et al. |
| 9,813,523 | B2 | 11/2017 | Bar Bracha et al. |
| 2003/0161265 | A1 | 8/2003 | Cao et al. |
| 2005/0220035 | A1 | 10/2005 | Ling et al. |
| 2006/0234639 | A1 | 10/2006 | Kushwaha et al. |
| 2009/0049152 | A1 | 2/2009 | Rimhagen et al. |
| 2009/0227251 | A1 | 9/2009 | Lei et al. |
| 2016/0162346 | A1 | 6/2016 | Dan et al. |
| 2018/0278571 | A1* | 9/2018 | Gal ............... H04L 61/1511 |
| 2020/0374181 | A1* | 11/2020 | Stenberg ........... H04W 24/00 |
| 2021/0076239 | A1* | 3/2021 | Hatonen ........... H04W 24/10 |
| 2021/0092020 | A1* | 3/2021 | Maguire ............ H04L 41/12 |

FOREIGN PATENT DOCUMENTS

| | | | |
|---|---|---|---|
| CN | 106850337 | A | 6/2017 |
| CN | 110892679 | A | 3/2020 |
| EP | 2849064 | A1 | 3/2015 |
| EP | 2854334 | A1 | 4/2015 |
| EP | 3099016 | A1 | 11/2016 |
| ES | 2348308 | T3 | 12/2010 |
| WO | 2009022966 | A1 | 2/2009 |
| WO | 2015057119 | A1 | 4/2015 |
| WO | 2015139732 | A1 | 9/2015 |
| WO | 2018228674 | A1 | 12/2018 |

OTHER PUBLICATIONS

3GPP TS 22.261 V16.3.0 (Mar. 2018), 3rd Generation Partnership Project; Technical Specification Group Services and System Aspects; Service requirements for the 5G system; Stage 1(Release 16), 54 pages.
3GPP TS 32.426 V14.1.0 (Sep. 2017), 3rd Generation Partnership Project; Technical Specification Group Services and System Aspects; Telecommunication management; Performance Management (PM); Performance measurements Evolved Packet Core (EPC) network(Release 14), 88 pages.
C. Demichelis et al, IP Packet Delay Variation Metric for IP Performance Metrics (IPPM). RFC3393, Nov. 2002, 21 pages.
3GPP TS 32.451 V14.0.0 (Apr. 2017), 3rd Generation Partnership Project; Technical Specification Group Services and System Aspects; Telecommunication management; Key Performance Indicators (KPI) for Evolved Universal Terrestrial Radio Access Network (E-UTRAN); Requirements(Release 14), 12 pages.
3GPP TS 23.501 V15.1.0 (Mar. 2018), 3rd Generation Partnership Project; Technical Specification Group Services and System Aspects; System Architecture for the 5G System; Stage 2(Release 15), 201 pages.
3GPP TS 32.455 V14.0.0 (Apr. 2017), 3rd Generation Partnership Project; Technical Specification Group Services and System Aspects; Telecommunication management; Key Performance Indicators (KPI) for the Evolved Packet Core (EPC); Definitions(Release 14), 15 pages.
3GPP TR 23.791 V0.3.0 (Apr. 2018), 3rd Generation Partnership Project; Technical Specification Group Services and System Aspects; Study of Enablers for Network Automation for 5G(Release 16), 19 pages.
3GPP TS 32.425 V14.1.0 (Dec. 2016), 3rd Generation Partnership Project; Technical Specification Group Services and System Aspects; Telecommunication management; Performance Management (PM); Performance measurements, Evolved Universal Terrestrial Radio Access Network (E-UTRAN) (Release 14), 82 pages.
Huawei, RAN Support for Core Network Slicing. RAN WG3 Meeting #93, Gothenburg, Sweden, Aug. 22-26, 2016, R3-161759, 13 pages.

* cited by examiner

CONTROL PLANE ENTITY AND MANAGEMENT PLANE ENTITY FOR EXCHANING NETWORK SLICE INSTANCE DATA FOR ANALYTICS

CROSS-REFERENCE TO RELATED APPLICATIONS

This application is a continuation of International Application No. PCT/EP2018/062226, filed on May 11, 2018, the disclosure of which is hereby incorporated by reference in its entirety.

TECHNICAL FIELD

The present disclosure relates generally to End-to-End (E2E) performance management and E2E Quality of Service (QoS) monitoring in a 5G network, particularly in the presence of one or more Network Slices (NSs) and/or one or more Network Sub Slices (NSSs). Specifically, the present disclosure relates to the exchanging, i.e. collecting and providing, of NS Instance (NSI) data, particularly NSI data for analytics, between the Control Plane (CP) and the Management Plane (MP).

To this end, the present disclosure presents, on the one hand, a control plane entity for obtaining NSI data for analytics from a management plane entity, and presents, on the other hand, a management plane entity to provide NSI data, particularly NSI data for analytics, to a control plane entity. Further, the present disclosure presents corresponding collecting and providing methods.

BACKGROUND 5G networks will support network slicing, wherein some NSs like for Ultra-Reliable Low Latency Communications (URLLC) will have very strict E2E performance requirements. Accordingly, E2E QoS should be closely monitored. However, it is not yet decided for 5G scenarios, which kinds of Key Performance Indicators (KPIs) and measurements could be provided, for instance, from an Access Network (AN) and Core Network (CN), in order to allow such an E2E QoS monitoring for guaranteeing strict E2E performance requirements.

Further, it is also still open for 5G scenarios, how the functions at the CN that are to perform analysis on measurements, can actually receive these measurements, in particular considering the existence of NSs and/or NSSIs.

Further, it is also still open for existing 5G scenarios, which kind of aggregated values despite sum, median, and average could be used to help on the identification of situations in the 5G scenarios having very strict E2E latency performance requirements, such as Vehicle-to-Anything (V2X) communications for remote driving, which requires 5 ms of E2E latency.

Current third generation partnership project (3GPP) evolve packet core (EPC) specifications, which define measurements for AN and CN as well as some KPIs (3GPP TS 32.425 V14.1.0, 3GPP TS 32.426 V14.0.0, 3GPP TS 32.451 V14.0.0, 3GPP TS 32.455 V14.0.0), are based on EPC entities, and measurements of how the procedures performed by these entities, e.g., number of attached requests. However, the specifications do not provide the necessary measurements or KPIs, in order to calculate and expose KPIs for E2E performance metrics (measurements about latency are only present for Downlink (DL) at the Radio Access Network (RAN) entity (eNodeB)).

In ES 2348308 T3 the E2E performance metrics are measured at end points, i.e. User Equipment (UE) or Data Network (DN)/gateways. However, it is not defined, which measurements are necessary to check the defined QoS profile. Also, no system is defined to measure the entities of the system that are related to the E2E session.

In U.S. Pat. No. 7,328,262 B2, user experience measurements are related to monitoring RAN QoS and faults, as well as to detecting faults in CP procedures that affect the user experience (such as attach or bearer modification procedures). However, no focus is put on providing measurements that allow the determination of contributors to E2E performance metrics in the mobile network.

In U.S. Pat. No. 9,424,121 B2, KPIs are collected and are used for Root Cause Analysis (RCA) of KPI degradation. However, no mechanism is specified for exposing Key Quality Indicators (KQIs) and KPIs to functions on the mobile networks, which can perform analytics with such exposed information.

In WO 205139732 A1 a system is defined for configuration of what needs to be collected and where (i.e., probes are defined). Data is then collected based on these defined probes, and the probes can be moved. However, no focus is put on measuring QoS metrics of CN and AN so as to determine the measurements related to E2E latency in the mobile network.

SUMMARY

In view of the above-mentioned challenges, the present disclosure aims to improve the existing 5G scenarios and approaches. The present disclosure has the objective to enable information to be collected and analyzed, in order to monitor the E2E QoS of a mobile network, particularly in the presence of NSIs and/or NSSIs. In particular, NSs with high E2E performance requirements should thus be better enabled. One aim of the disclosure is to provide finer grain information, e.g. about how much a given UP segment of a NS contributes to the E2E performance. The present disclosure also intends to define measurements and KPIs that allow improved E2E QoS monitoring for meeting the strict E2E performance requirements.

The objective of the present disclosure is achieved by the solution provided in the enclosed independent claims. Advantageous implementations of the present disclosure are further defined in the dependent claims.

In particular the present disclosure proposes a control plane entity for collecting NSI data for analytics and a management plane entity for providing NSI data. One main idea of the disclosure is thereby to enable different options for data collection methods that can be performed between the control plane entity and the management plane entity. Another main idea of the disclosure is the types of performance measurements and KPIs designed for different levels of information collection (NS level, NSS level, User Plane Network Function (UPF) level, Network Function (NF) level, AN level, Transport Network (TN), and/or Virtualization level).

One embodiment of the present disclosure provides a control plane entity for obtaining NSI data for analytics from a management plane entity, the control plane entity being configured to request NSI topology information from the management plane entity, and obtain at least one first set of KPIs and/or at least one set of measurements, generate data for analytics based on the requested NSI topology information and the obtained first set of KPIs and/or set of measurements.

Based on the requested topology information and the obtained (i.e. received and/or calculated) KPIs and/or measurements, the control plane entity is able to generate the data for analytics that allows improved E2E QoS monitoring for achieving higher E2E performance in the presence of NSs and/or NSSIs.

In one embodiment, the control plane entity is configured to receive the at least one first set of KPIs and/or set of measurements from the management plane entity.

This implementation form presents an option for the data collection, in which the control plane entity does not have to calculate any KPIs, but is provided with all information necessary to obtain the data for analytics.

In one embodiment, the received at least one first set of KPIs includes: a set of KPIs per individual entity of the NSI, and a set of KPIs per path of at least one Network Sub Slice Instance, NSSI.

These types of KPIs provide a finer information of the NSI and/or NSSI, and thus enable a better E2E QoS monitoring.

In one embodiment, the control plane entity is further configured to calculate at least one second set of KPIs based on the NSI topology information and the received first set of KPIs and/or the received set of measurements.

Accordingly, the control plane entity is in this implementation able to calculate at least some necessary KPIs, which allow it to improve its E2E QoS monitoring. The obtained NSI topology information thereby supports the control plane entity in calculating finer grain KPI information for improved monitoring.

In one embodiment, the calculated at least one second set of KPIs includes: a set of KPIs per path of a NSI, a set of KPIs for latency percentile impact per NSI entity per path of NSI, and a set of KPIs for latency percentile impact per path of NSI.

These types of KPIs provide an even finer information about the NSI and/or NSSI, and thus an even better E2E QoS monitoring. These KPIs may particularly ensure QoS monitoring for URLLC.

In one embodiment, the control plane entity is further configured to request information about a UPF and/or AN from the management plane entity.

Accordingly, information beyond AN and UPF (NF) status can be collected and analyzed, in order to monitor the E2E QoS.

In one embodiment, the control plane entity is further configured to receive a first set of measurements related to links connecting entities of the NSI from an AN to a termination point towards a DN from the management plane entity.

The measurements concerning the links connecting the entities of the NSI allows the control plane entity to better monitor the E2E QoS. In particular, it can determine how each of the links influences the E2E performance.

In one embodiment, the control plane entity is further configured to collect a second set of measurements related to a UPF directly from the UPF, and/or collect a third set of measurements related to an AN directly from the AN.

Enabling the control plane entity to directly collect measurements allows the control plane entity to more quickly obtain needed measurements, in order to calculate KPIs and thus monitor the E2E QoS performance.

In one embodiment, the control plane entity is further configured to calculate a plurality of sets of KPIs based on the NSI topology information and the received first set of measurements and/or the directly collected second and/or third sets of measurements.

In one embodiment, the plurality of sets of KPIs include: a set of KPIs per individual entity of a NSI, a set of KPIs per path of a NSSI, a set of KPIs per path of a NSI, a set of KPIs for latency percentile impact per NSI entity per path of NSI, and a set of KPIs for latency percentile impact per path of NSI.

These types of KPIs provide the control plane entity with very detailed information to implement E2E QoS monitoring reliably for high-performance requirements.

In one embodiment, the control plane entity comprises a Network Data Analytics Function, NWDAF, wherein the NWDAF is configured to consume services from a NS Management Function of the management plane entity via a first interface, and the NWDAF is configured to consume services from a NSS Management Function of the management plane entity via a second interface.

This provides an implementation of the control plane entity into the 5GS architecture.

One embodiment of the present disclosure provides a management plane entity for providing NSI data to a control plane entity, the management plane entity being configured to collect or request, particularly from a Virtualization and/or TN Management entities, a first set of measurements related to links connecting entities of a NSI from an AN to a termination point towards a DN as well as information about virtualized NFs of a NSI, and/or collect a second set of measurements related to a UPF from the UPF and/or collect a third set of measurements related to an AN from the AN, and expose the first, second and/or third set of measurements to the control plane entity.

Because the management plane entity exposes the various kinds of measurements and/or KPIs to the control plane entity, the control plane entity is able to implement an improved E2E QoS monitoring, which enables higher E2E performance, particularly in the presence of NSIs and/or NSSIs.

In one embodiment, the management plane entity is further configured to calculate a plurality of sets of KPIs based on at least one collected set of measurements, particularly calculate at least one first set of KPIs in a NSS Management Function of the management plane entity, and calculate at least one second set of KPIs in NS Management Function of the management plane entity.

Thus, the management plane entity may already calculate at least some KPIs, which it then provides to the control plane entity for the generation of the data for analytics.

In one embodiment, the management plane entity is further configured to expose all sets of measurements and/or all sets of KPIs to the control plane entity, and/or expose one or more sets of measurements and/or one or more sets of KPIs to the control plane entity, particularly by the NS Management Function via a first interface to the control plane entity and/or by the NSS Management Function via a second interface to the control plane entity.

Thus, the control plane entity is made aware of relevant measurements and/or KPIs, which allow it to generate the data for analytics for an improved E2E QoS monitoring.

In one embodiment, the plurality of sets of KPIs include: a set of KPIs per individual entity of a NSI, a set of KPIs per path of a NSSI, a set of KPIs per path of a NSI, a set of KPIs for latency percentile impact per NSI entity per path of NSI, and/or a set of KPIs for latency percentile impact per path of NSI.

These KPIs provide the control plane entity with fine grain information to monitor the E2E performance of a NSI and/or NSSI.

One embodiment of the present disclosure provides a method for obtaining Network Slice Instance, NSI, data for analytics from a management plane entity, the method comprising requesting NSI topology information from the management plane entity, and obtaining at least one first set first set of Key Performance Indicators, KPIs, and/or at least one set of measurements, and generating the data for analytics based on the requested NSI topology information and the obtained first set of KPIs and/or set of measurements.

The method can be developed further by implementation forms corresponding to the implementation forms of the control plane entity of the first aspect. Accordingly, the method achieves all advantages and effects of the control plane entity of the first aspect and its implementation forms, respectively.

One embodiment of the present disclosure provides a method for providing Network Slice Instance, NSI, data to a control plane entity, the method comprising collecting or requesting, particularly from a Virtualization and/or Transport Network Management entities, a first set of measurements related to links connecting entities of a NSI from an AN, to a termination point towards a DN, as well as information about virtualized NFs of a NSI, and/or collecting a second set of measurements related to UPF from the UPF and/or collecting a third set of measurements related to an AN from the AN, and exposing the first, second and/or third set of measurements to the control plane entity.

The method can be developed further by implementation forms corresponding to the implementation forms of the management plane entity of the second aspect. Accordingly, the method of the fourth aspect achieves all advantages and effects of the management plane entity of the second aspect and its implementation forms, respectively.

It has to be noted that all devices, elements, units and means described in the present application could be implemented in the software or hardware elements or any kind of combination thereof. All operations which are performed by the various entities described in the present application as well as the functionalities described to be performed by the various entities are intended to mean that the respective entity is adapted to or configured to perform the respective operations and functionalities. Even if, in the following description of specific embodiments, a specific functionality or operation to be performed by external entities is not reflected in the description of a specific detailed element of that entity which performs that specific operation or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which.

DETAILED DESCRIPTION OF EMBODIMENTS

Figure 1:
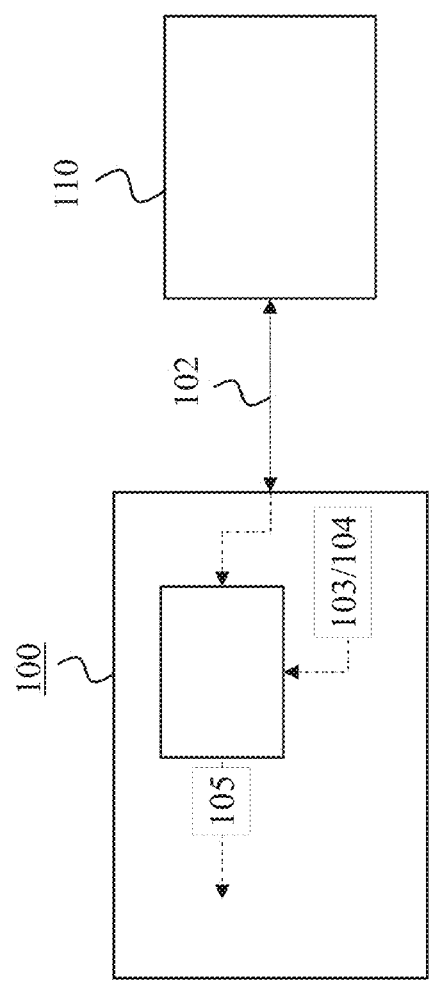
FIG. 1 shows a control plane entity according to an embodiment of the present disclosure.

FIG. 1 shows a control plane entity 100 according to an embodiment of the present disclosure. The control plane entity 100 is in particular suited to obtain NSI data for analytics 105 from a management plane entity 110. The control plane entity 100 is situated in a control plane, and the management plane entity 110 is situated in a management plane. The control plane entity 100 may be a NWDAF, and may be implemented by means of one or more processors and/or by software running on a computing device. The management plane entity 110 may include NS and NSS management functions, respectively, and may be implemented by means of one or more processors and/or by software running on a computing device.

The control plane entity 100 is configured to request NSI topology information 102 from the management plane entity 110, and is further configured to obtain at least one first set of KPIs 103 and/or at least one set of measurements 104. The KPIs 103 may in particular be calculated by the control plane entity 100 and/or may be received from the management plane entity 110. The sets of measurements 104 may be received from the management plane entity 110 and/or may be received directly from a UPF and/or AN (explained later).

The obtained KPIs 103 may include KPIs 103 per individual entity of a NSI, per path of a NSSI, per path of a NSI, for latency percentile impact per NSI entity per path of NSI, and/or for latency percentile impact per path of NSI. The obtained measurements 104 may include measurements 104 related to links connecting entities of an NSI from an AN to a termination point towards a DN, measurements related to a UPF and/or measurements related to an AN. More details about the KPIs 103 and measurements 104 will be given below.

The control plane entity 100 is further configured to generate the data for analytics 105 based on the requested NSI topology information 102 and the obtained first set of KPIs 103 and/or set of measurements 104.

Figure 2:
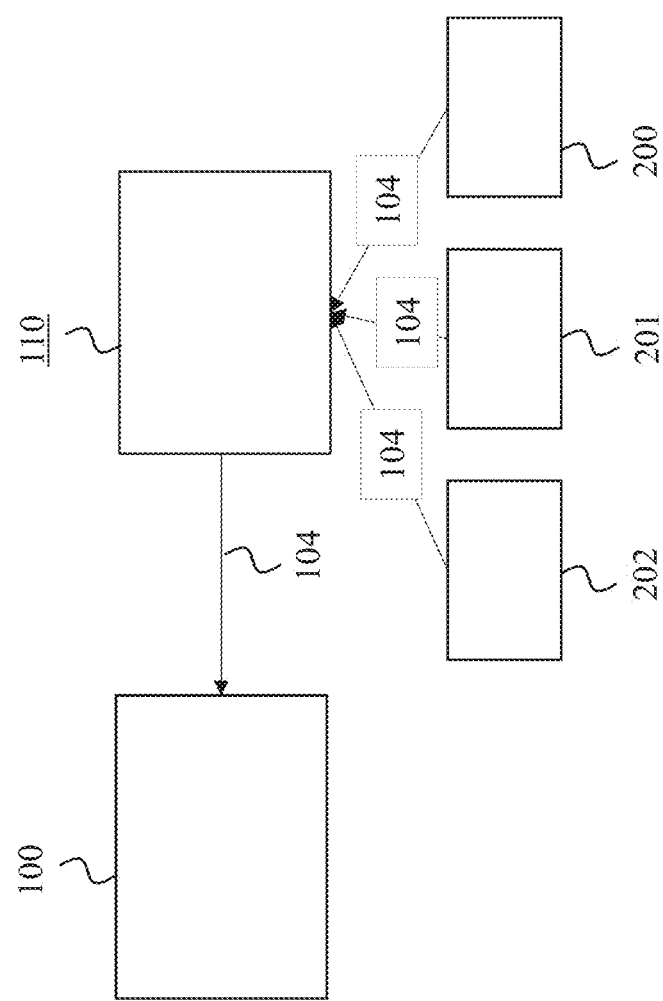
FIG. 2 shows a management plane entity according to an embodiment of the present disclosure.

FIG. 2 shows a management plane entity 110 according to an embodiment of the present disclosure. The management plane entity 110 is in particular suitable for providing NSI data to a control plane entity 100. The management plane entity 110 of FIG. 2 may be the management plane entity 110 already shown in FIG. 1, and likewise the control plane entity 100 shown in FIG. 2 may be the control plane entity 100 already shown in FIG. 1.

Figure 6:
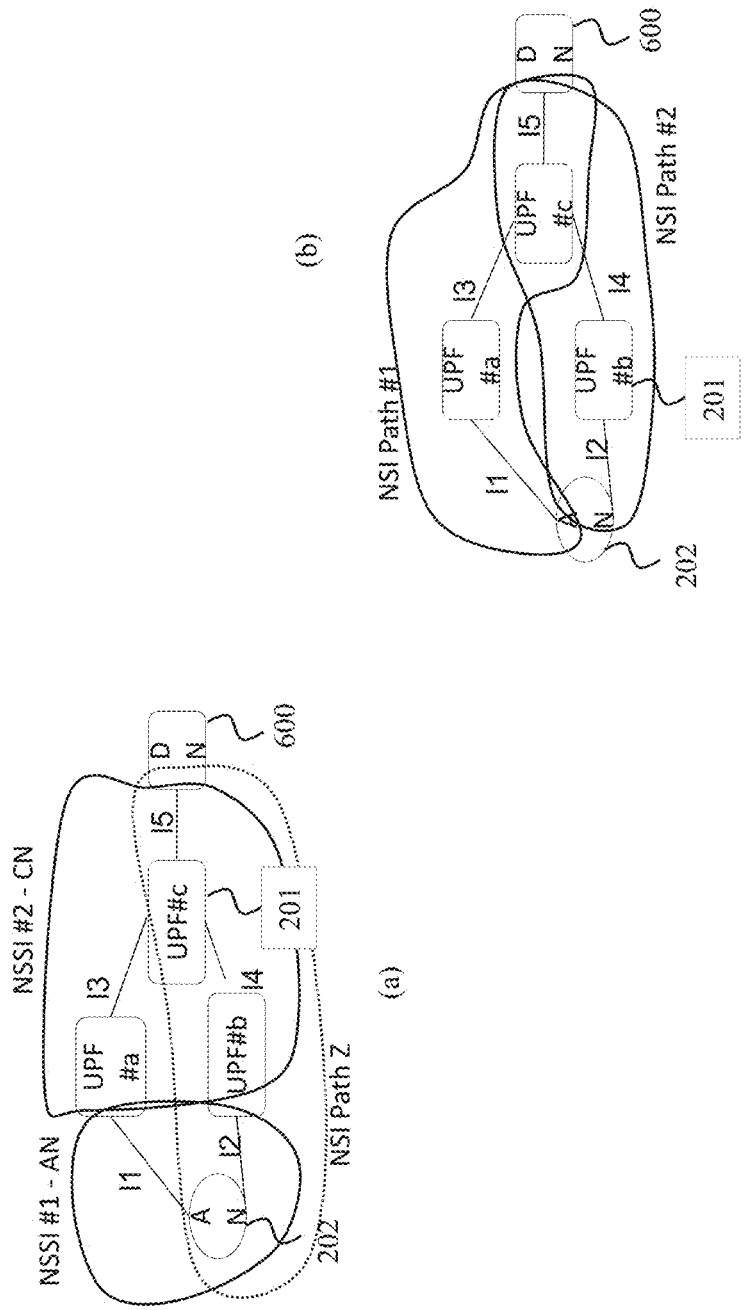
FIG. 6 shows in (a) an illustration of entities belonging to an NSI, examples of an NSSI, and examples of possible paths within the NSI, and shows in (b) a path of a NSI.

The management plane entity 110 is configured to collect or request, particularly from Virtualization and/or TN Management entities 200, a first set of measurements 104 related to links connecting entities of a NSI from an AN 202 to a termination point towards a DN 600 (see FIG. 6) as well as information about virtualized NFs of a NSI, and/or to collect a second set of measurements 104 related to a UPF 201 from the UPF 201 and/or to collect a third set of measurements 104 related to an AN 202 from the AN 202.

Accordingly, the measurements 104 may be as described above with respect to the control plane entity 100 of FIG. 1. The management plane entity 110 is further configured to expose the first, second and/or third set of measurements 104 to the control plane entity 100.

The management plane entity 110 may be further configured to calculate a plurality of sets of KPIs 103 based on at least one collected set of measurements 104. The management plane entity 100 is in this case configured to expose all sets of measurements 104 and/or all sets of KPIs 103 to the control plane entity 100, and/or to expose one or more sets of measurements 104 and/or one or more sets of KPIs 103 to the control plane entity 100. Notably, the KPIs 103 may be the same as described above with respect to the control plane entity 100 of FIG. 1.

Figure 3:
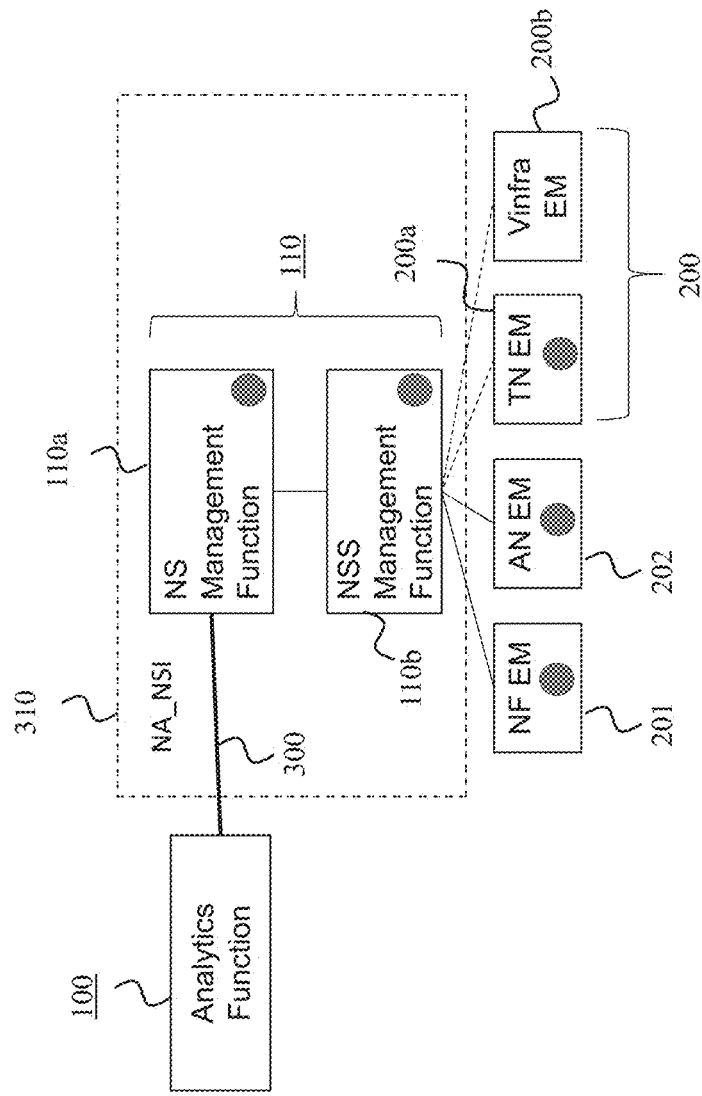
FIG. 3 shows a first option for data collection performed by a control plane entity and a management plane entity according to embodiments of the present disclosure.
Figure 4:
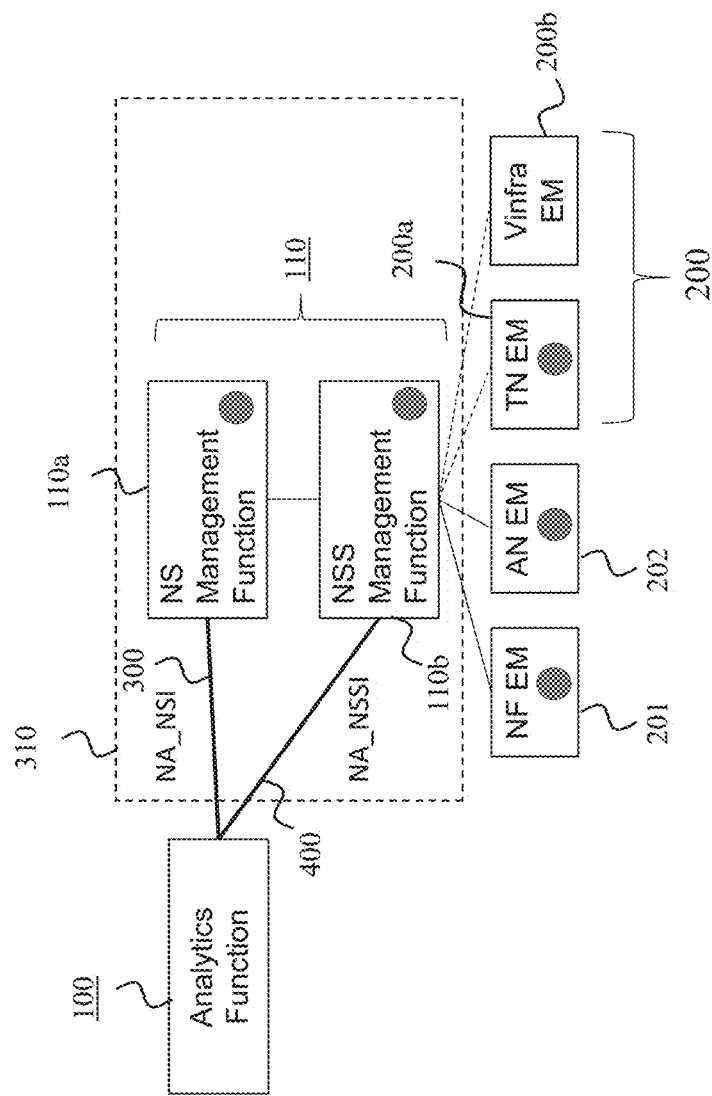
FIG. 4 shows a second option for data collection performed by a control plane entity and a management plane entity according to embodiments of the present disclosure.
Figure 5:
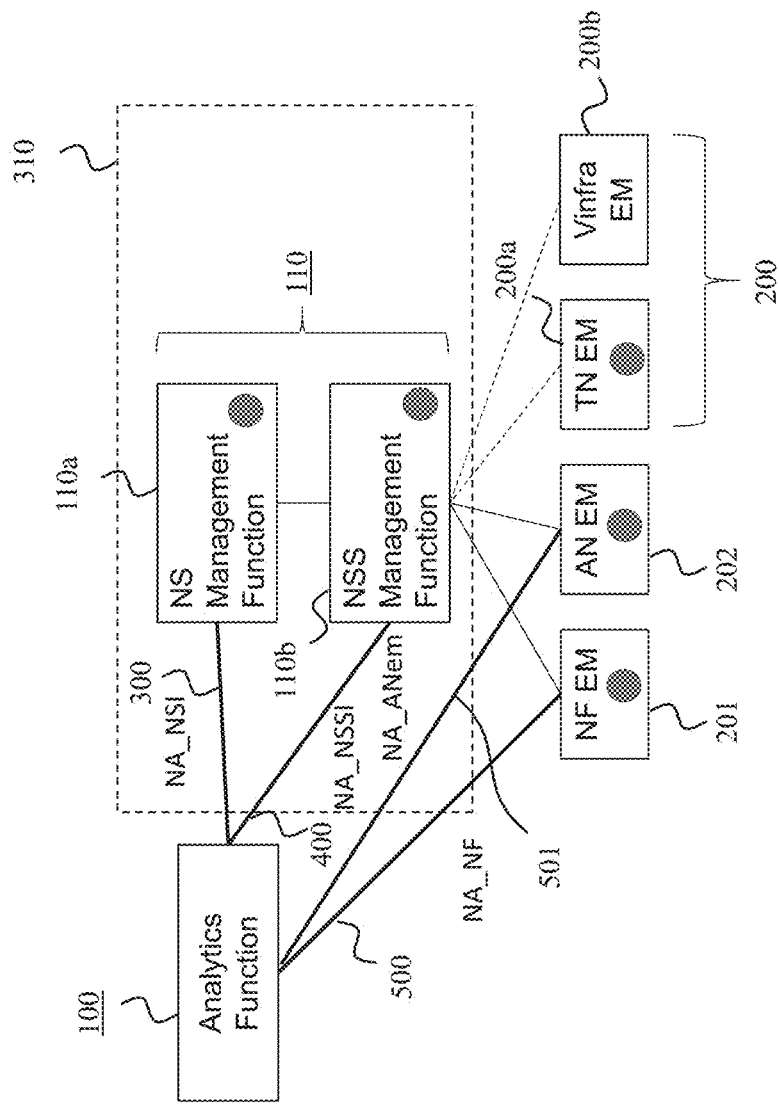
FIG. 5 shows a third option for data collection performed by a control plane entity and a management plane entity according to embodiments of the present disclosure.

FIGS. 3-5 show different options for data collection performed by a control plane entity 100 and a management plane entity 110 according to embodiments of the present disclosure. The control plane entity 100 thereby builds on the control plane entity 100 shown in FIG. 1, and the management plane entity 110 builds on the management plane entity 110 shown in FIG. 2. Accordingly, same elements in these figures are respectively labelled with the same reference signs and functional likewise.

The three options for data collection are explained below with respect to FIG. 3, FIG. 4 and FIG. 5, respectively, as well as the types of performance measurements 104 and KPIs 103 designed for the different levels of information collection (i.e., NS level, NSS level, UPFs/AN/TN/Virtualization level). The different sets of measurements 104 (M1-M3) and the different sets of KPIs 103 (K1-K5) will be explained in more detail after the three options for the data collection are generally described. Also the interfaces between the involved entities will then be described in more detail.

FIG. 3 shows a first option for the data collection. In particular, the first option of FIG. 3 includes a direct collection of NSI information and indirect collection of NSSI and UPF/NF/NE (Network Entity) information. FIG. 3 illustrates the entities and interfaces associated with the first option, and below are described preferred operations associated with this first option.

Operation 0: The control plane entity 100 (here named "Analytics Function") registers to receive the topology information 102, and the KPIs 103 and/or measurements 104 from a NS Management Function 110a of the management plane entity 110 situated in the management plane 310.

Operation 1: A NSS Management Function 110b of the management plane entity 100 directly collects measurement sets M1 and M2 related to UPFs 201 (NFs) and AN 202.

Operation 2: The NSS Management Function 110b either directly collects the measurements of a set M3 from the Virtualization and TN Management functions 200 or it requests such information from those functions 200.

Operation 3: The NSS Management Function 110b calculates sets K1 and K2 of KPIs 103.

Operation 4: The NSS Management Function 110b exposes measurement sets M1 and M2, and UPFs 201 and AN 202 from sets K1 and K2 of KPIs 103 towards the NS Management Function 110a.

Operation 5: The NS Management Function 110a calculates remaining sets K3-K5 of KPIs 103.

Operation 6: The NS Management Function 110a exposes all sets of measurements 104 and sets of KPIs 103 to the Analytics Function 100.

FIG. 4 shows a second option for the data collection. In particular, the second option of FIG. 4 includes a direct collection of NSI and NSSI information and an indirect collection of NF/AN/TN/Virtualized information. FIG. 4 illustrates the entities and interfaces associated with the second option, and below are described preferred operations associated with this second option.

Operation 0: The Analytics Function (control plane entity 100) requests via a first interface 300 between the management plane entity 110 and the control plane entity 100 (referred to as interface NA_NSI) topology information 102, e.g. about NSSIs associated with a NSI.

Operation 1: The Analytics Function 100 registers to receive the KPIs 103 and/or the measurements 104 from the NSS Management Function 110b of the management plane entity 110 associated with requested NSI.

Operation 2: The NSS Management Function 110b directly collects the measurement sets M1 and M2 related to UPFs 201 and AN 202.

Operation 3: The NSS Management Function 110b either directly collects the measurements of set M3 from the Virtualization and TN Management functions 200 or it requests such information from those functions 200.

Operation 4: The NSS Management Function 110b calculates the sets K1 and K2 of KPIs 103.

Operation 5: The NSS Management Function 110b exposes via a second interface 400 between the management plane entity 110 and the control plane entity 100 (referred to as interface NA_NSSI) measurements 104 from M1, M2, and M3, as well as KPIs 103 related to K1 and K2 to the Analytics Function 100.

Operation 6: The Analytics Function 100 calculates the remaining sets K3-K5 of KPIs 103 with the information from NS Management Function 110a and NSS Management Function 110b.

FIG. 5 shows a third option for the data collection. In particular, the third option of FIG. 5 includes a direct collection of NSI, NSSI, and NF AN/TN/Virtualized information. FIG. 5 illustrates the entities and interfaces associated with the third option, and below are described preferred operations associated with this third option.

Operation 0: The Analytics Function (control plane entity 100) requests via the first interface 300 (NA_NSI) information about NSSIs and the topology information 102, e.g. associated with paths within a NSI from the NS Management function 110a.

Operation 1: The Analytics Function 100 requests via the second interface 400 (NA_NSSI) information about UPFs 201 and AN 202 associated with NSSIs.

Operation 2: The Analytics Function 100 registers via the second interface 400 (NA_NSSI) to receive the measurements 104 from set M3 from the NSS Management Function 110b.

Operation 3: The Analytics Function 100 directly collects from a UPF 201 (via a third interface 500 between the control plane entity 100 and the UPF 201, referred to as interface NA_NF), and directly collects from an AN 202 (via a fourth interface 501 between the control plane entity 100 and the AN 202, referred to as interface NA_ANem) measurements 104 sets M1 and M2 related to the UPF 201 and AN 202.

Operation 4: The NSS Management Function 110b either directly collects the measurements 104 of set M3 from the Virtualization and TN Management functions 200 or it requests such information from those functions 200.

Operation 5: The NSS Management Function 110b exposes to the Analytics Function 100 via the second interface 400 (NA_NSSI) measurements 104 from set M3.

Operation 5: The Analytics Function 100 calculates all sets K1-K5 of KPIs 103 with the information from the NS Management Function 110a and NSS Management Function 110b.

In summary, the above-described options for the data collection include: direct collection of NSI information and indirect collection of NSSI and NF/AN/TN/Virtualized information; direct collection of NSI and NSSI information and indirect collection of NF/AN/TN/Virtualized information; and direct collection of NSI, NSSI, and NF/AN/TN/Virtualized information.

Next, the above-described first interface 300 (NA_NSI), second interface 400 (NA_NSSI), third interface 500 (NA_NF) and fourth interface 501 (NA_ANem) are described in more detail.

The first interface 300 is between the control plane entity 100 and the NS Management Function 110a of the management plane entity 110. Via this interface 300, a NSI allows consumers (such as a NWDAF 700 (see FIG. 7), which is the control plane entity 100) to configure packet type, percentile, and periodicity of the measurements 104 in the sets M1, M2, M3 for the first and second data collection options. For the third data collection option the configuration is necessary only for the measurement 104 of set M3. Depending on the option of the data collection method, the first interface 300 will expose different information towards the control plane entity 100. For instance, NSSI associated with NSI and/or KPIs 103 and measurements 104 and/or NSI topology information 102.

The second interface 400 is between the control plane entity 100 and the NSS Management Function 110b of the management plane entity 110. Via this second interface 400, measurements 104 from sets M1, M2, and M3 as well as KPIs 103 related to AN 202 and UPFs 201 from sets K1 and K2 of KPIs 103 are exposed.

The third interface 500 is between the control plane entity 100 and one or more UPFs 201. Via this third interface 500 measurements related to the set M2 are exposed to the control plane entity 100.

The fourth interface 501 is between the control plane entity 100 and the AN 202. Via this fourth interface 501, measurements 104 related to set M1 are exposed to the control plane entity 100 and/or the NSSI Management Function 110b and/or UPFs 201 and AN 201 (AN EM) that are used according with the option for data collection method.

Next, the above-described sets of measurements 104 are described in more detail. Sets of measurements 104 may generally be related to AN 202, UPFs 202, and data links of a NSI. The type of measurements 104 are, for instance: processing/link latency, packet delay variation (PDV), throughput, and/or error rate. For all these types of measurements 104, the following statistical values may be collected: average, maximum, minimum, variance, and/or percentile (which is a parameter configurable). These measurements 104 can be collected in the granularity of type of packet and/or QoS qualifiers of the data flows in the NSI. All measurements are collected for both UL (Uplink) and DL (Downlink) separately.

The set M1 relates to measurements 104 from the AN 202. The set M2 relates to measurements 104 from one or more UPFs 201. The set M3 relates to measurements 104 from links connecting entities of a NSI from AN 202 until the termination point towards the DN.

Next, the above-described sets of KPIs 103 are described in more detail. Sets of KPIs 103 may be related to individual performance of entities composing the NSI (such as UPFs 201, AN 202, and each data link of the NSI), and aggregated information at the NSSI level, and aggregated information at the level of NSI. All KPIs 103 may be calculated for both UL and DL separately. The sets of KPIs K1, K2, and K3 are calculated for all types of measurements 104 considered in this disclosure. The sets of KPIs K4 and K5 are specifically related to latency.

The set K1 relates to KPIs 103 per individual entity of a NSI. The set is for identifying the impact of percentile in the average of individual entities of the NSI and may be calculated as indicated in the formula below:

$$[\text{Type-of-measurement}]\text{PercentileExceedingAvg} = (1 - ([\text{type-of-measurement}])\text{Avg}/[\text{type-of-measurement}]\text{Percentile}))*100$$

The set K2 relates to KPIs 103 per path of a NSSI. The set is defined to determine the performance of the entities within each NSSI taking into account the different paths as illustrated in FIG. 6(a). The types of KPIs 103 defined in the set M3 are discussed below.

KPI 103 associated with average latency of a NSSI within a NSI path is the sum of the contributors of an NSSI path. For instance, with respect to FIG. 6(a) an average latency for of NSI Path Z related to NNSI #2 is calculated by the sum of average UPF #b and UPF #c processing latency, plus average latency of 14 and 16.

KPIs 103 associated with throughput or Packet Delay Variation (PDV) or error rate of a NSSI within a NSI path can be configured to be based either on the highest or lowest value observed in one entity of the NSI path. For instance, with respect to FIG. 6(a) the percentile KPI 103 for throughput of NSI Path Z on NSSI #2 can either take into account the lowest or the highest percentile value of UPF #b or UPF #c or 14 or 16.

The set K3 relates to KPIs 103 per path of a NSI. These KPIs 103 are for identifying E2E performance of a given type of measurement per path of a NSI. FIG. 6(b) shows an example of a NSI path related to the E2E KPIs 103 defined in this set. As described above for the set K2, average latency KPI 103 per NSI latency may be calculated as the sum of the average latency values per contributing entity in the NSI path. Throughput or PDV or error rate per NSI path can be configured to be based either on the highest or lowest value observed for such type of measurement 104 in one entity of the NSI path.

The set K4 relates to KPIs 103 for latency percentile impact per NSI entity per path of a NSI. The goal of the KPIs 103 defined in this set is to support the identification of how the latency percentile of entities in different NSSI of an NSI path are affecting the average E2E latency of a NSI path. For instance, considering the NSI Path #2 illustrated in FIG. 6(b), to identify the impact of the AN latency percentile in the NSI path, the following formula may be used:

ANPercentileULProcDelayImpactOnULE2EAvgLatency:
   ANPercentileULProcDelay+
   $L1$AverageULDelay+PerPathUFPAverageUL-
   ProcDelay+$L4$AverageULDelay+
   $L5$AverageULDelay The set K5 relates to KPIs 103 for latency percentile impact per path of a NSI. The goal of the KPIs 103 defined in this set is to identify how much a percentile value of one of the entities in a NSI path is exceeding the average E2E latency of NSI paths. For instance, to identify the impact of AN 202 processing latency percentile in the E2E average latency of the NSI Path #2, the following formula may be used:

ANPercentileExceedingE2EAvgLatency=(1−
   PerNSIPathE2EAvgLatency/ANProcessingLa-
   tencyPercentile))*100

Services in the NS Management Function 110*a*, the NSS Management Function 110*a*, the UPFs 201, the AN 202, and/or TN EM/Virtualized EM, are used by the proposed interfaces in this disclosure for data collection. However, these services can also be consumed by any other entity allowed to retrieve the measurements 104 and KPIs 103 these services expose (e.g., some other function within the management plane 310).

Figure 7:
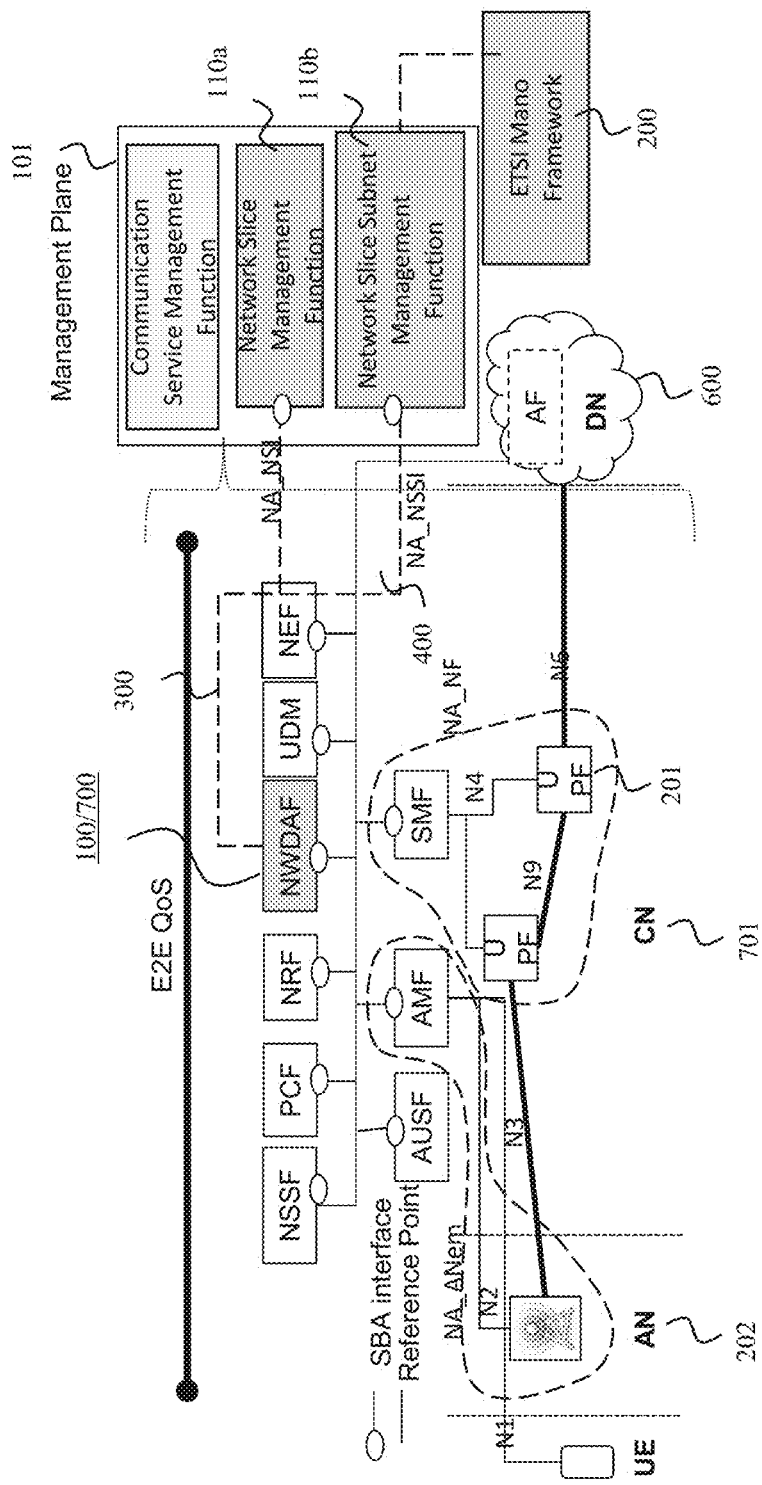
FIG. 7 shows a control plane entity and a management plane entity according to embodiments of the present disclosure for a 5GS Architecture.

FIG. 7 shows a control plane entity 100 and a management plane entity 110 according to embodiments of the present disclosure in a specific implementation. The implementation is based on the architecture and functionalities of the 3GPP Architecture for 5G Core Networks defined in TS23.501 and the Management solutions for 5GS defined in 3GPP TS28.x series. The key elements of the 5GS core network architecture, the 5G management functions, as well as the indication of the extensions of this embodiment to such functions and architecture are depicted in FIG. 7. In FIG. 7 all extensions and interfaces are indicated regardless of the option for the data collection that is to be used. For instance, if the first option for the data collection is used, then there is no need to use the second, third and fourth interfaces 400, 500 and 501 (NA_NSSI, NA_NF, and NA_ANem), respectively. However, for simplicity of representation, the 5GS is shown as in a case supporting all three options of the data collection.

The following functions and interfaces are implemented with respect to FIG. 7 as follows:

An extension of the NWDAF 700 with the functionalities of the control plane entity 100 (Analytics Function) as described above according to the operations of the different options for the data collection.

An extension of the NS Management Function 110*a* and NSS Management Function 110*b* of the 3GPP 5G Management Architecture (management plane entity 110) to perform the operations defined in the different options of the data collection described above.

According with 3GPP, all issues related to TN and Virtualization 200 will be handled by ETSI MANO Framework. Therefore, the KPIs 103 of MANO are extended, in order to provide the set M3 of measurements 104.

The interface between the NSS Management Function 110*b* and MANO is also updated to enable the parametrization of how the M3 set of measurements 104 is to be collected (for instance, which percentile should be used, i.e., 90%-percentile or 99%-percentile), and to allow for the actual collection of the M3 set of measurements 104.

The first and second interfaces 300 and 400 (NA_NSI and NA_NSSI) are defined, respectively, between the NWDAF 700 and the NS Management Function 110*a*, as well as the NWDAF 700 and the NSS Management Function 110*b* of the management plane entity 110.

Two alternatives are possible for the third interface 500 (NA_NF):

a) NWDAF 700 may have indirect access to UPF 201 measurements 104. In this case, the Service Based Architecture (SBA) interface exposed by a Session Management Function (SMF) may be extended to support the functionalities defined for NA_NF 500 and NWDAF 700 to access the SMF services to collect the M2 set of measurements 104. This also means that the SMF is the entity responsible for collecting the measurements 104 directly from the UPFs 201 via extensions of N4 interface to support the collection of the measurements 104 in set M2.

b) NWDAF 700 may have direct access to the UPF 201 measurements 104. In this case, the NA_NF 500 is a new interface between NWDAF 700 and UPFs 201. It is proposed to define a SBA service in UPF 201 that exposes the measurements 104 in M2 set. In this case, the NWDAF 700 registers to UPF 201 services in order to be notified about the measurements 104.

Also for the fourth interface 501 (NA_ANem), there are the same two options as listed above for the third interface 500. Namely, the NWDAF 700 may have indirect access to measurements 104 of the M1 set using Access Management Function (AMF) as the relay of information. Alternatively, the NWDAF 700 may have direct access to AN 202 measurements 104. The same considerations about SBA services extensions discussed above (but now related to AMF and AN 202) apply also for these two possible implementations of the fourth interface 501.

For the data collection of sets M1 and M2 of measurements 104, exact points in the entities of the 3GPP 5G Architecture shown in FIG. 7, where the data is collected, may be defined.

Figure 8:
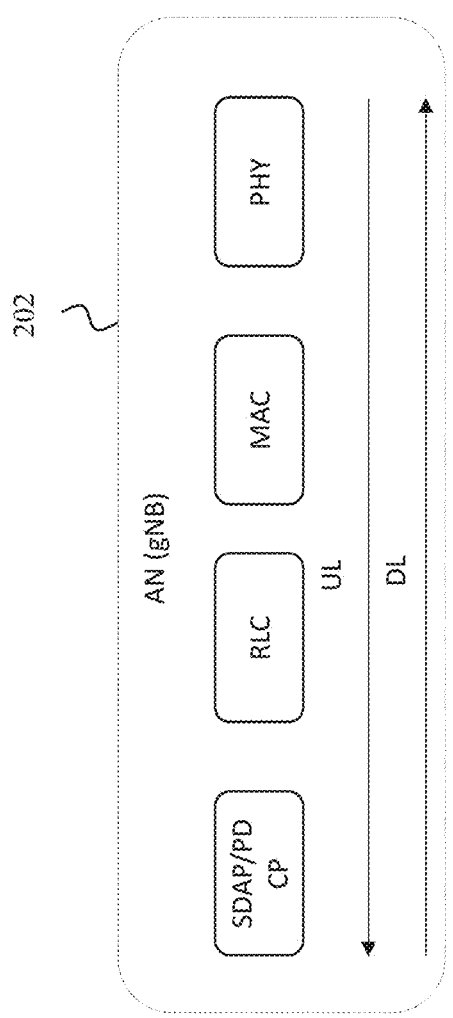
FIG. 8 shows measurement points in an Access Network.

In this respect FIG. 8 shows measurement points in an AN 202. The set M1 of measurements 104 of the AN 202 for UL will take in consideration packets being treated by Physical (PHY) level and SDAP/PDCP, and for DL vise-versa.

For M2 set measurements 104 of UPF 201 there are two different measurement points also taking into account the type of sessions established in the UPF 201. This is shown and explained with respect to FIG. 9, which shows in (a) measurement points for PDU Sessions and in (b) measurement points for unstructured non 3GPP Access.

Figure 9:
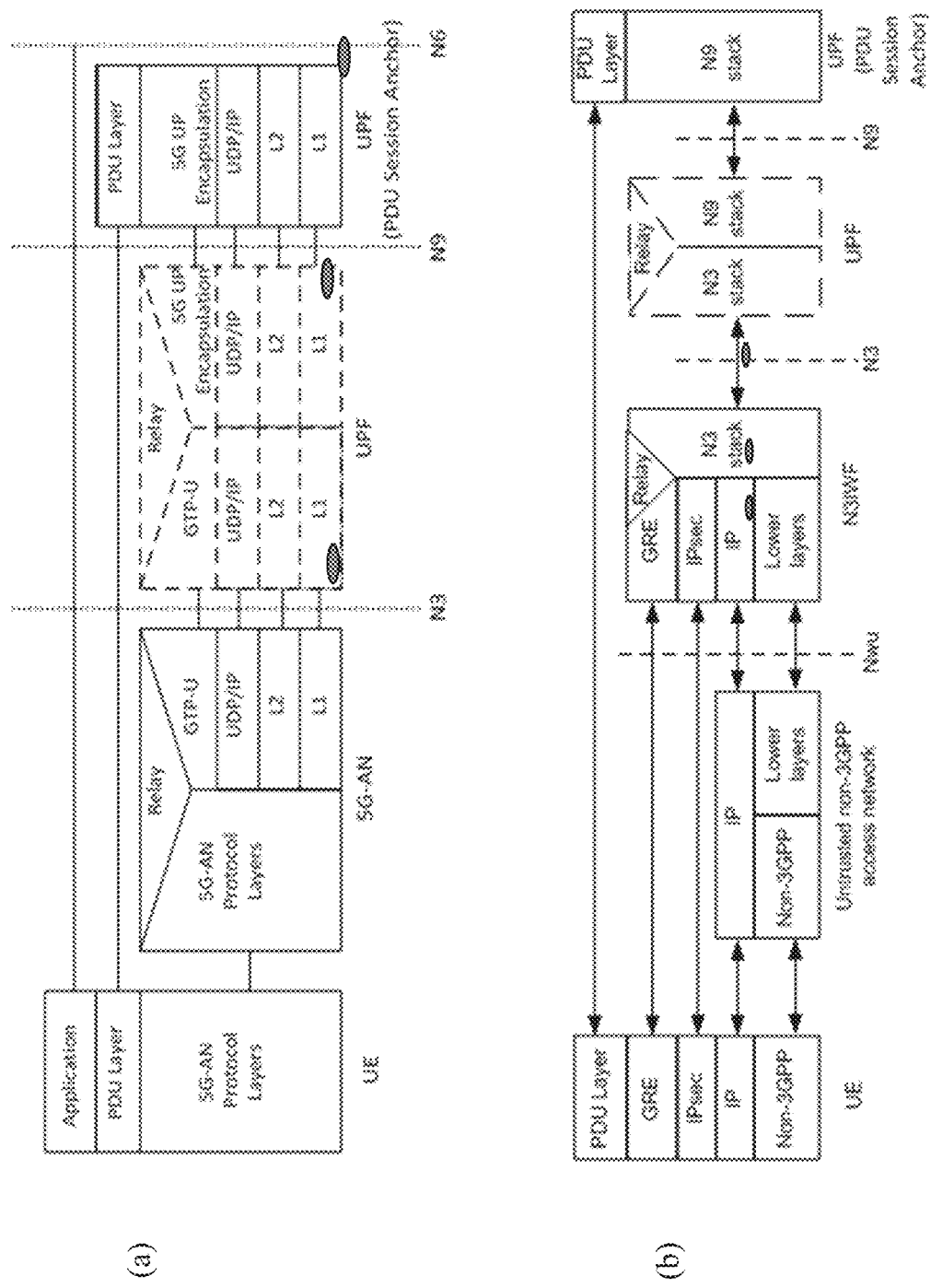
FIG. 9 shows in (a) measurement points for PDU Sessions and in (b) measurement points for unstructured non-3GPP Access.

For Protocol Data Unit (PDU) Sessions the protocol stack and measurement points are illustrated FIG. 9(*a*). In addition, there can exist different deployments of UPFs 201:

a) In the first case, there is only one N9 interface in a NSI path, i.e., there is only one UPF 201 between AN 200 and the DN 600. In this case, the measurements involve the network L1 towards N3 and N6 of such UPF 201.

b) In the second case, there exist a chain of UPFs 201 between the AN 202 and DN 600. In this case, there are three measurement points. Firstly, for the UPF 201 connected to AN 202 the measurement points are at L1 for N3 and N9. Secondly, for the UPFs 201 connected only by N9 interface, the measurements 104 will be done in L1 of N9s linking to the different UPFs 201 of the NSI path. Thirdly, for the UPFs 201 connected to N6 and another UPF 201 (for a given NSI path) the measurements points are L1 from N9 and N6.

For UP Protocol Stack for unstructured non 3GPP Access, measurement points are illustrated in FIG. 9(b). In this case, the measurements 104 are performed at the entry point of the network interfaces at N3 stack, N9 stack. The same issue about chaining UPFs 201 applies for the measurement 104 of unstructured non 3GPP access.

Figure 10:
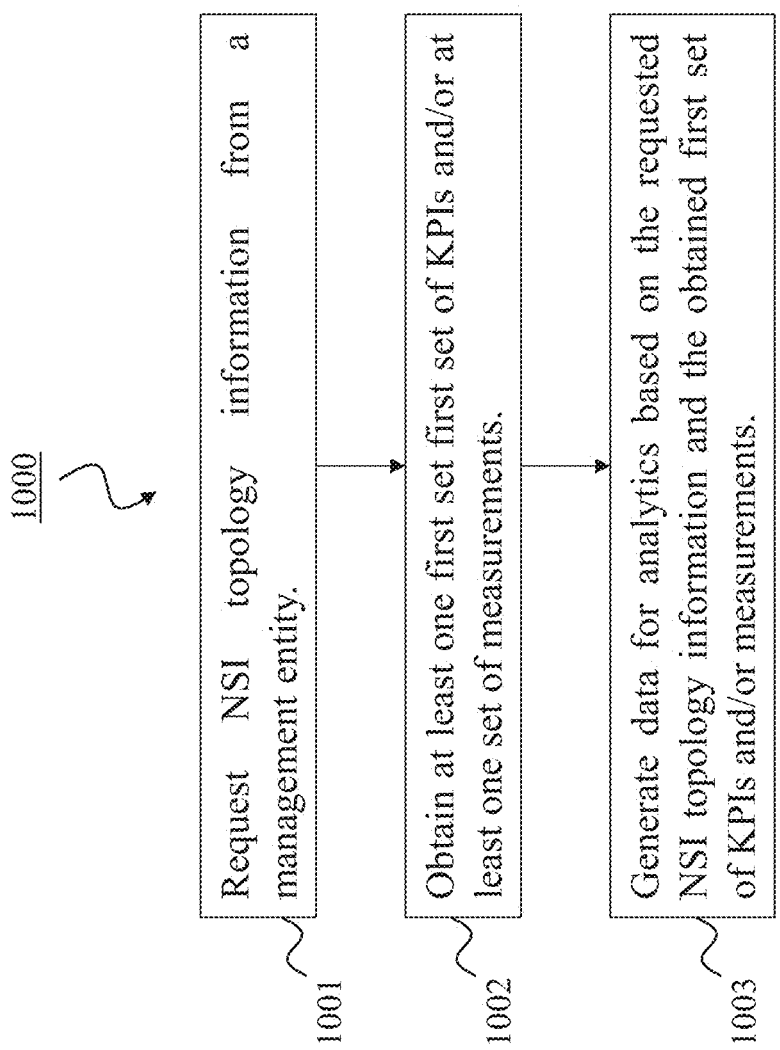
FIG. 10 shows a NSI data collecting method according to an embodiment of the present disclosure.

FIG. 10 shows a method 1000 according to an embodiment of the present disclosure. The method is in particular for obtaining NSI data for analytics 105 from management plane entity 110. The method 1000 may be performed by a control plane entity 100, as shown in FIG. 1.

The method 100 comprises operation 1001 of requesting NSI topology information 102 from the management plane entity 110. Further, operation 1002 of obtaining at least one first set first set of KPIs 103 and/or at least one set of measurements 104. Further, operation 1003 of generating the data for analytics 105 based on the requested NSI topology information 102 and the obtained first set of KPIs 103 and/or set of measurements 104.

Figure 11:
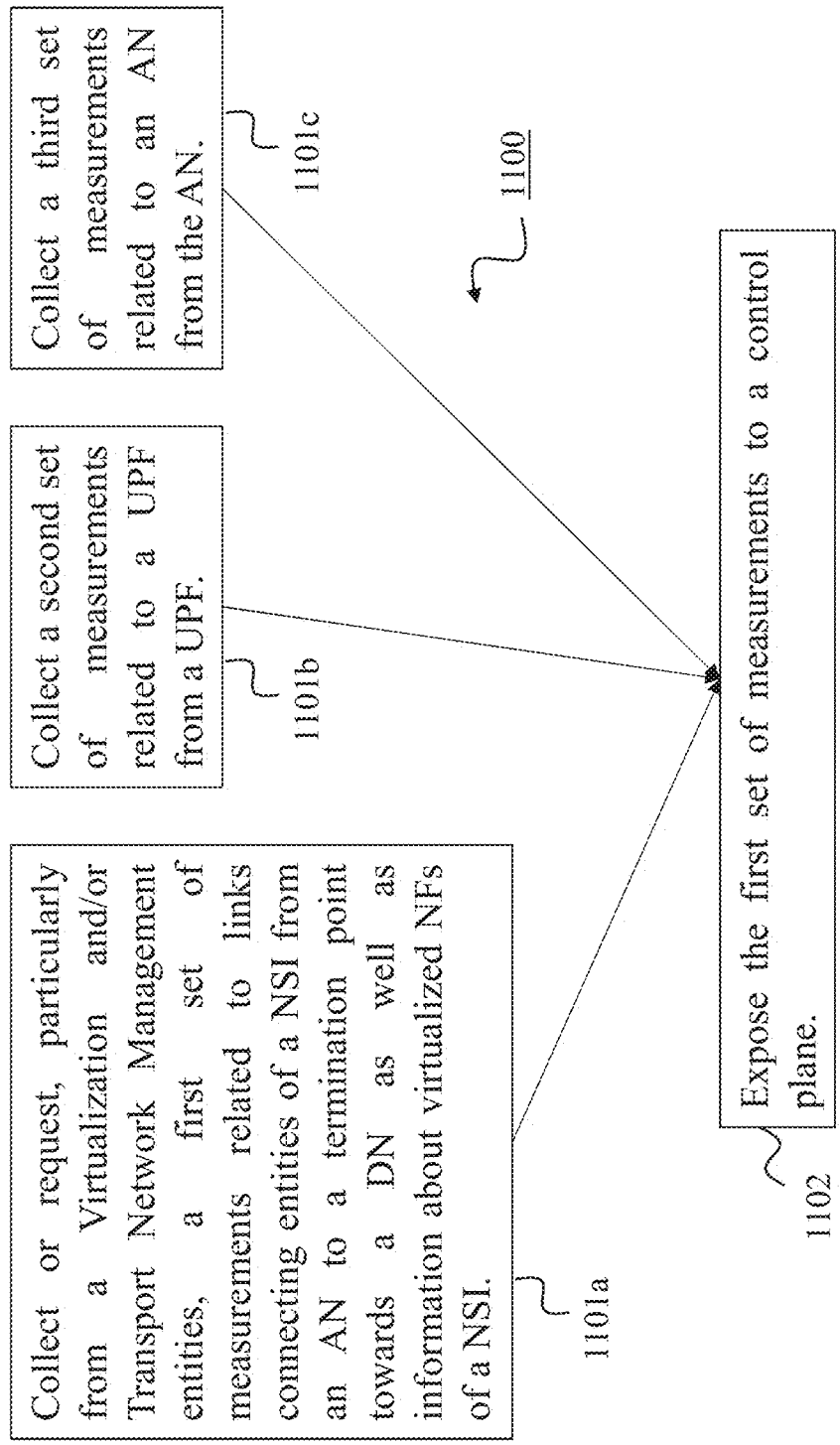
FIG. 11 shows a NSI data providing method according to an embodiment of the present disclosure.

FIG. 11 shows a method 1100 according to an embodiment of the present disclosure. The method is in particular for providing NSI data to a control plane entity 100. The method 1100 may be performed by a management plane entity 110, as shown in FIG. 2.

The method 1100 may comprise operation 1101a of collecting or requesting, particularly from a Virtualization and/or TN Management entities 200, a first set of measurements 104 related to links connecting entities of a NSI from an AN 202 to a termination point towards a DN 600 as well as information about virtualized NFs of a NSI. Alternatively or additionally, the method 1100 may comprise operation 1101b of collecting a second set of measurements 104 related to a UPF 201 from the UPF 201. Alternatively or additionally, the method 1100 may comprise operation 1101c of collecting a third set of measurements 104 related to an AN 202 from the AN 202.

The method 1100 further comprises operation 1102 of exposing the first, second and/or third set of measurements 104 to the control plane entity 100.

The main advantages provided by the disclosure, implemented by the control plane entity 100 and the management plane entity 110 respectively, are that:

The disclosure enables information beyond AN 202 and NF 201 status to be collected and analyzed, in order to determine E2E QoS of mobile networks.

It enables 5GS to have a more fine grain information about how much each User Plane (UP) segment of a Network Slice (NS) contributes to the E2E performance (such as latency of each segment of the network contributing for the Packet Delay Budget (PDB)).

The disclosure enables 5GS to use the defined measurements 104 and KPIs 103 as sources of information for developing solutions for dynamically adapting the 5GS, in order to assure the fulfilment of E2E QoS requirements.

The disclosure enables E2E QoS assurance for Ultra-Reliable Low Latency Communications (URLLC):

Assurance that E2E latency is being fulfilled needs to apply not only for users in the performance range of the average, because in addition to E2E latency URLLC also requires reliability in the order of 99.99xxx %. This means that it is not enough to identify the E2E latency in average, but it is also necessary to observe the E2E latency for users in the 99-percentile. Only if average and 99-percentile are fulfilled, then it is possible to indicate how the E2E latency for URLLC is being provided.

Measurements for detection of situations affecting the E2E latency need to consider the breakdown of PDB into AN 202, CN UP link transmission and UPF 201 processing time.

Using precise measurement operators can detect exactly where a problem in the E2E latency of URLLC is happening and can adjust the network accordingly. For instance, if the average E2E latency is not within PDB, this means that operators need to reevaluate the provisioning of the NSI. If only the percentile E2E latency is not within PDB, this means that operators need to further investigate where the problem for users in this range is happening.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or operations and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A control plane entity for obtaining Network Slice Instance (NSI) data for analytics from a management plane entity, comprising:
   a processor; and
   a memory storing instructions, which when executed by the processor, cause the processor to
      request NSI topology information from the management plane entity, wherein the NSI topology information comprises information associated with one or more paths within an NSI;
      obtain at least one first set of Key Performance Indicators (KPIs) or at least one set of measurements, and
      generate the NSI data for analytics based on the requested NSI topology information comprising information associated with the one or more paths within the NSI and at least one of the at least one first set of KPIs or the at least one set of measurements.

2. The control plane entity according to claim 1, wherein the instructions further cause the processor to
   receive the at least one first set of KPIs or the at least one set of measurements from the management plane entity.

3. The control plane entity according to claim 2, wherein the at least one first set of KPIs includes:
   a set of KPIs per individual entity of an NSI, and
   a set of KPIs per path of at least one Network Sub Slice Instance (NSSI).

4. The control plane entity according to claim 2, wherein the instructions further cause the processor to
   calculate at least one second set of KPIs based on the NSI topology information and at least one of the first set of KPIs or the set of measurements.

5. The control plane entity according to claim 4, wherein the at least one one second set of KPIs includes:
   a set of KPIs per path of an NSI,
   a set of KPIs for latency percentile impact per NSI entity per path of NSI, and
   a set of KPIs for latency percentile impact per path of NSI.

6. The control plane entity according to claim 1, wherein the instructions further cause the processor to
request information about a User Plane Network Function (UPF) or Access Network (AN) from the management plane entity.

7. The control plane entity according to claim 6, wherein the instructions further cause the processor to
receive a first set of measurements related to links connecting entities of an NSI from an AN to a termination point towards a Data Network (DN) from the management plane entity.

8. The control plane entity according to claim 7, wherein the instructions further cause the processor to
collect a second set of measurements related to a UPF directly from the UPF, or
collect a third set of measurements related to an AN directly from the AN.

9. The control plane entity according to claim 8, wherein the instructions further cause the processor to
calculate a plurality of sets of KPIs based on the NSI topology information and at least one of the following: the first set of measurements, the second set of measurements, or the third set of measurements.

10. The control plane entity according to claim 9, wherein the plurality of sets of KPIs include:
a set of KPIs per individual entity of an NSI,
a set of KPIs per path of a Network Sub Slice Instance (NSSI),
a set of KPIs per path of an NSI
a set of KPIs for latency percentile impact per NSI entity per path of an NSI, and
a set of KPIs for latency percentile impact per path of an NSI.

11. The control plane entity according to claim 1, wherein the instructions further cause the processor to
consume services from a Network Slice (NS) Management Function of the management plane entity via a first interface, and
consume services from a Network Sub Slice (NSS) Management Function of the management plane entity via a second interface.

12. A management plane entity for providing Network Slice Instance (NSI) data to a control plane entity, comprising:
a processor; and
a memory storing instructions, which when executed by the processor, cause the processor to
collect or request, from a Virtualization or Transport Network Management entities, a first set of measurements related to links connecting entities within an NSI from an Access Network (AN) to a termination point towards a Data Network (DN) and information about virtualized network functions (NFs) within the NSI,
collect a second set of measurements related to a User Plane Network Function (UPF) from the UPF,
collect a third set of measurements related to an AN from the AN, and
expose the first, the second, and the third set of measurements to the control plane entity.

13. The management plane entity according to claim 12, wherein the instructions further cause the processor to
calculate a plurality of sets of Key Performance Indicators (KPIs) based on at least one of the collected sets of measurements,
calculate at least one first set of KPIs in a Network Sub Slice (NSS) Management Function of the management plane entity, and
calculate at least one second set of KPIs in a Network Slice (NS) Management Function of the management plane entity.

14. The management plane entity according to claim 13, wherein the instructions further cause the processor to
expose all of the collected sets of measurements or all of the calculated sets of KPIs to the control plane entity, or
expose one or more sets of measurements or one or more sets of KPIs to the control plane entity,
by the NS Management Function via a first interface to the control plane entity or by the NSS Management Function via a second interface to the control plane entity.

15. The management plane entity according to claim 14, wherein the plurality of sets of KPIs include:
a set of KPIs per individual entity of an NSI,
a set of KPIs per path of a Network Sub Slice Instance (NSSI),
a set of KPIs per path of an NSI,
a set of KPIs for latency percentile impact per NSI entity per path of an NSI, and
a set of KPIs for latency percentile impact per path of an NSI.

16. A method for obtaining Network Slice Instance (NSI) data for analytics from a management plane entity, the method comprising
requesting NSI topology information from the management plane entity, wherein the NSI topology information comprises information associated with one or more paths within an NSI;
obtaining at least one first set first set of Key Performance Indicators (KPIs) or at least one set of measurements, and
generating the NSI data for analytics based on the NSI topology information comprising information associated with the one or more paths within the NSI and at least one of the at least one first set of KPIs or the at least one set of measurements.

17. The method according to claim 16, further comprising receiving the at least one first set of KPIs or the at least one set of measurements from the management plane entity.

18. The method according to claim 17, wherein the at least one first set of KPIs includes:
a set of KPIs per individual entity of an NSI, and
a set of KPIs per path of at least one Network Sub Slice Instance (NSSI).

19. The method according to claim 17, further comprising calculating at least one second set of KPIs based on the NSI topology information and at least one of the first set of KPIs or the set of measurements.

20. The method according to claim 19, wherein the at least one second set of KPIs includes:
a set of KPIs per path of an NSI,
a set of KPIs for latency percentile impact per NSI entity per path of NSI, and
a set of KPIs for latency percentile impact per path of NSI.

* * * * *